United States Patent [19]
Jesrai et al.

[11] Patent Number: 5,127,220
[45] Date of Patent: Jul. 7, 1992

[54] METHOD FOR ACCELERATING A GAS TURBINE ENGINE

[75] Inventors: Tariq Jesrai, Tempe; Todd S. Carlson, Chandler, both of Ariz.

[73] Assignee: Allied-Signal Inc., Morris Township, Morris County, N.J.

[21] Appl. No.: 662,527

[22] Filed: Feb. 28, 1991

[51] Int. Cl.⁵ .............................. F02C 7/277
[52] U.S. Cl. .................... 60/39.02; 60/39.142
[58] Field of Search ............ 60/39.02, 39.091, 39.141, 60/39.142; 74/7 R, 7 C

[56] References Cited

U.S. PATENT DOCUMENTS

| | | | |
|---|---|---|---|
| 3,521,505 | 7/1970 | Sebring | 60/39.142 |
| 3,793,826 | 2/1974 | Holleboom et al. | 60/39.142 |
| 4,899,534 | 2/1990 | Sorenson | 60/39.142 |
| 4,914,906 | 4/1990 | Burch | 60/39.142 |

*Primary Examiner*—Louis J. Casaregola
*Attorney, Agent, or Firm*—Joseph R. Black; James W. McFarland; Robert A. Walsh

[57] ABSTRACT

A method for accelerating a gas turbine engine (10) with an air turbine starter (14) employs sensor data (48, 50) indicative of both starter speed and engine speed to enable speed-synchronized engagement of the starter output shaft (16) with an engine input shaft (18), thereby minimizing clutch damage and engine restart time.

6 Claims, 3 Drawing Sheets

METHOD FOR ACCELERATING A GAS TURBINE ENGINE

TECHNICAL FIELD

The present invention relates generally to methods for starting gas turbine engines, and more specifically to those which employ air turbines as starters.

BACKGROUND OF THE INVENTION

Gas turbine engines on a wide variety of commercial and military aircraft are started with air turbine starters. The pneumatically-driven starter applies acceleration torque to an input shaft of a gearbox which is in driving engagement with a tower shaft, and the tower shaft is in turn in driving engagement with the main shaft of the engine. From a cold start, the starter provides all acceleration torque until the engine reaches its light-off speed, after which both the starter and the engine provide acceleration torque until the engine reaches a predetermined speed commonly referred to as the "starter cut-out speed". At the cut-out speed, pneumatic power to the inlet of the starter is discontinued. Thus, prior turbine engine starting methods include the steps of sensing the rotational speed of the starter output shaft and responding to the cut-out speed by decreasing mass flow of air to the starter inlet.

During startup acceleration, driving engagement between the starter and the engine is effected through a clutch which couples the output shaft of the starter with the input shaft of the gearbox. When pneumatic power to the starter is discontinued, backdrive torque develops on the output shaft of the starter. This torque is used to assist disengagement in a manner which depends on the design of the clutch. Some starters incorporate an overrunning clutch that allows the output shaft to be driven by the engine without engaging the gear train of the starter. Others effect disengagement in a manner which permits the output shaft to come to rest. All pose mechanical problems that limit the ability to timely restart the engine when it is decelerating. Avoiding clutch failures and damage induced by high-speed running engagements requires that the engine be permitted to decelerate until its speed is within a range which is acceptable in view of the mechanical limitations of the starter. This invention is directed to overcoming the above-described limitation.

SUMMARY OF THE INVENTION

The invention provides a method for accelerating a gas turbine engine with an air turbine starter in a fashion which effects speed-synchronized engagement.

In its preferred form the method comprises the steps of sensing the rotational speeds of both the output shaft of the starter and the starter input shaft of an engine-mounted gearbox; and selectively responding to the sensed rotational speeds when the speed of the input shaft is initially greater than the speed of the output shaft but less than a predetermined speed, by: first, increasing mass flow of pressurized air to the starter whereby the starter is accelerated until the speed of the output shaft exceeds the speed of the input shaft; second, decreasing mass flow of the air to the starter whereby the starter is decelerated until the speeds of the input and output shafts are substantially equal; third, engaging the output shaft in driving relation with the input shaft when their speeds are substantially equal; and fourth, again increasing mass flow of the air to the starter whereby the engine is accelerated until the speed of the input shaft is substantially equal to a predetermined speed.

DESCRIPTION OF THE PREFERRED EMBODIMENT

Figure 1:
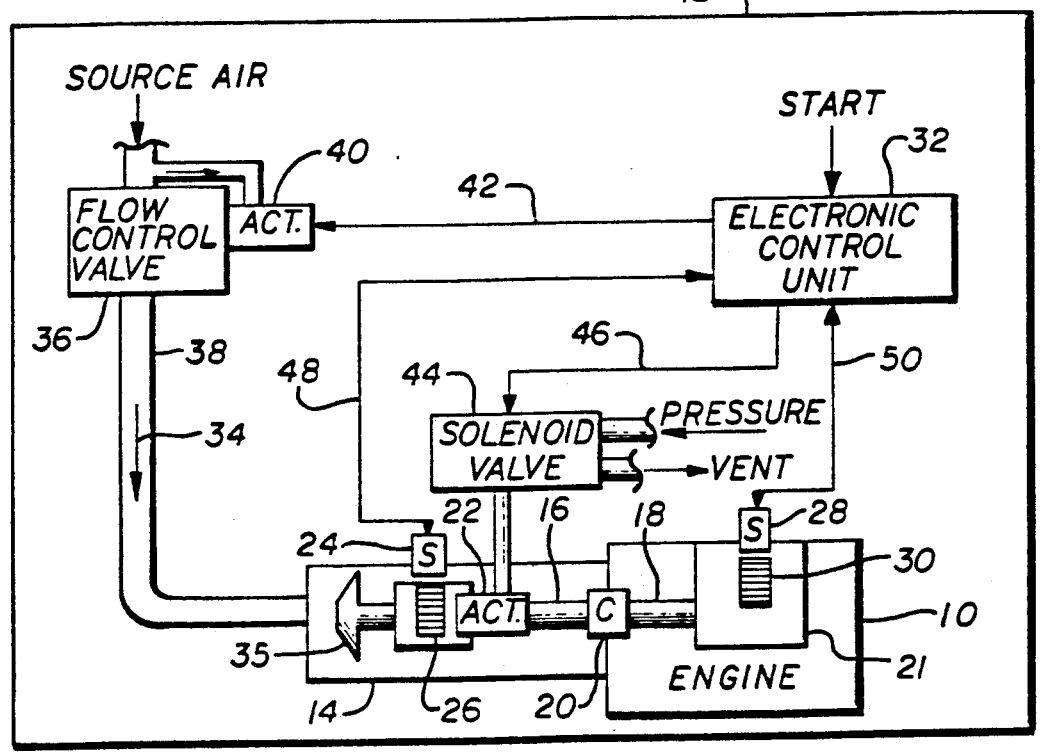
FIG. 1 is a schematic illustration of an aircraft adapted to practice the inventive method.

FIG. 1 of the drawings schematically illustrates the operational environment in which the method of the invention is practiced. A gas turbine engine 10 installed on an aircraft 12 is suitably adapted for connection of an air turbine starter 14 to an engine-mounted gearbox 21. The output shaft 16 of the starter 14 can be selectively coupled with the starter input shaft 18 of the gearbox 21 via a coupling mechanism 20, the latter of which may be a face jaw clutch, a gear tooth face clutch, a dog clutch, or other conventional coupling means. The input shaft 18 typically extends outwardly from the gearbox 21, and is drivingly engaged with the main shaft (not shown) of the engine 10. The selective coupling of the output and input shafts 16,18 is achieved through use of an actuator 22 operatively associated with the starter 14. The actuator may be a coil/armature combination installed in the starter 14 and operative in direct response to electronic control signals to extend the output shaft 16 until the latter is engaged with the input shaft 18. The arrangement illustrated in FIG. 1, however, contemplates the use of a pneumatic piston/cylinder actuator 22 which is pressurized or vented in response to a change in the position of an external three-way solenoid valve 44. The latter is actuated in response to control signals 46 communicated from a remote electronic control unit 32.

Figure 2:
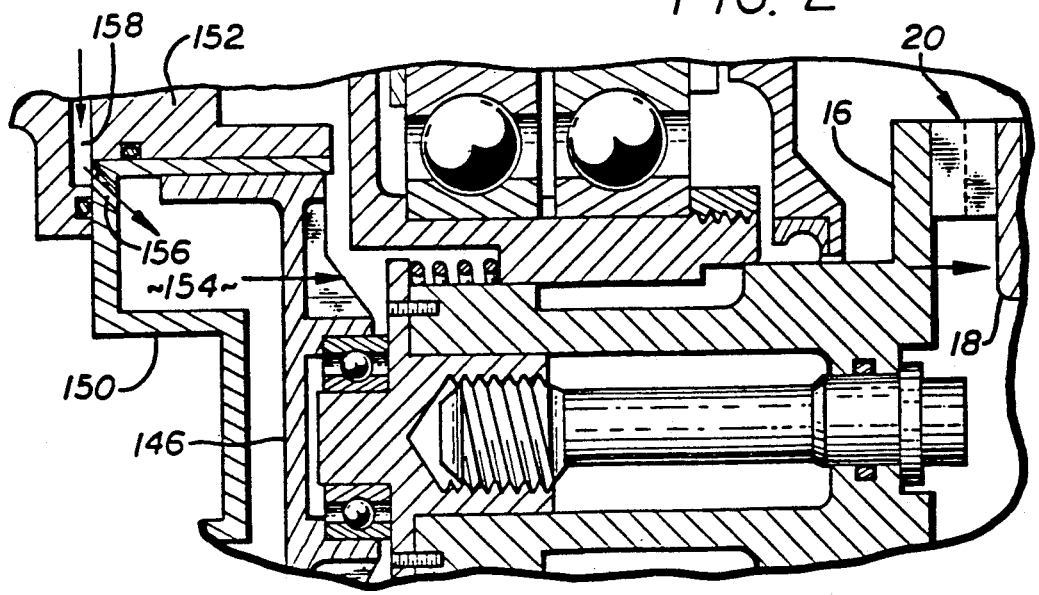
FIG. 2 is a fragmentary view taken from FIG. 4.
Figure 4:
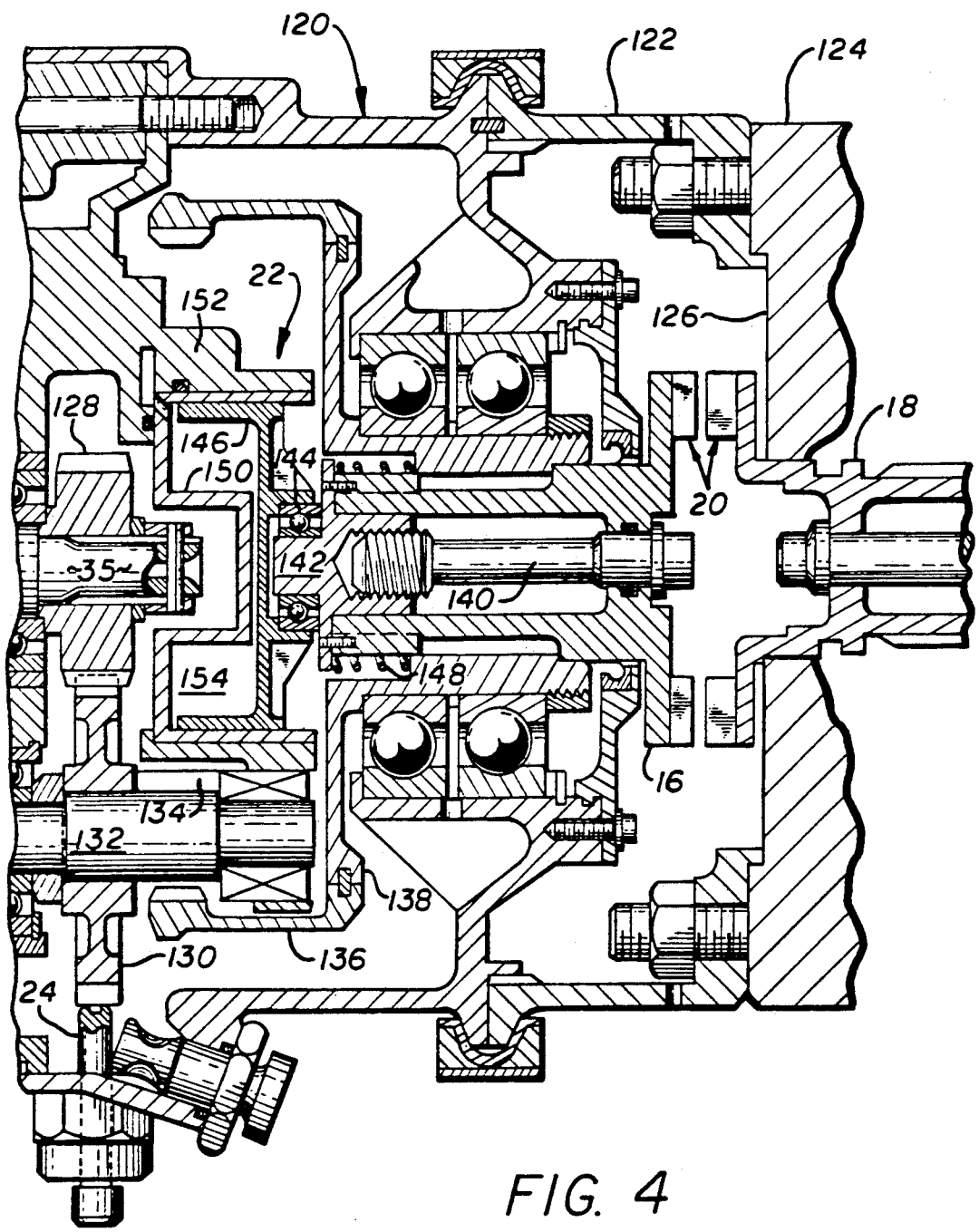
FIG. 4 is a partial cross-sectional view, somewhat schematic, of an air turbine starter adapted for selective engagement with a gas turbine engine. The starter is shown mounted on the engine gearbox.

Such an arrangement can be implemented as shown in FIG. 4, which illustrates an air turbine starter 120 connected through a mounting adapter 122 to the gearbox 124. The input shaft 18 extends outwardly from the starter pad 126 of the gearbox casement, and is shown disengaged from the output shaft 16. Aside from the actuator 22 and attendant adaptation, the starter 120 is of conventional construction, employing a planetary gear train. Driven with the turbine 35 is a sun gear 128 that is engaged with one of three planet gears 130. Rotating in splined engagement with each planet gear is a planet shaft 132 that also embodies a secondary planet gear 134. Each secondary planet gear 134 is engaged with a ring gear 136 which is rigidly secured to a hub gear 138. The hub gear 138 is in splined engagement with but slidable relative to the output shaft 16. Slots (not shown) formed through the hub gear 138 permit the passage of lubricant to the spline interface between the hub gear and the output shaft 16. An axially-extending bolt 140 rigidly secures an adaptor 142 to the shaft 16. The adaptor 142 is pressed into the inner race of a bearing 144, and the outer race of the latter is pressed into a cylindrical sleeve formed in a piston 146. A compression spring 148 seats on an annular land formed on the hub gear 138, and on an annular boss formed on the adaptor 142 as shown. The spring 148 biases the combination of the piston 146, bearing 144, adaptor 142, bolt 140, and output shaft 16 to the left as viewed in the drawing. Accordingly, the coupling mechanism 20 is prevented from engaging the output shaft 16 in driving relation with the input shaft 18. A cylinder 150 rigidly seated in the planetary gear carrier 152 cooperates with the piston 146 to define a pressurization chamber 154. Channels are formed through the cylinder 150 (as at 156), the carrier 152 (as at 158), and the starter housing to accommodate fluid communication to and from the solenoid valve 44 (FIG. 1). When the chamber 154 is pressurized, the piston 146 moves to the right and the coupling mechanism 20 puts the output shaft 16 in driving engagement with the input shaft 18, as is illustrated in FIG. 2.

A first sensor 24 is connected to the starter 14 and positioned to respond to the teeth of a gear 26 (such as planet gear 130 in FIG. 4) which rotates in direct proportion to the rotational speed of the output shaft 16. A second sensor 28 is connected to the engine gearbox and positioned to respond to the teeth of an internal gear 30 which rotates in direct proportion to the rotational speed of the input shaft 18. The sensors 24, 28 are preferably of the magnetic reluctance type, forming elements of electronic oscillator circuits. Alternatively, the sensors 24, 28 may be of the optical reflectance type, forming photosensitive elements of an electronic circuit, or may comprise a fluidic device in combination with a transducer. Moreover, the illustrated sensor 28 may not be needed where the engine speed data can be accessed by extant sensing means aboard the aircraft 12. The sensors 24,28 are in operative communication with the control unit 32.

The starter 14 receives and is driven by pressurized air 34 which is supplied by a ground power cart, or is bled from an on-board compressor or turbine, or is accessed from an on-board pressure vessel. Air flow to the rotor 35 of the starter 14 is blocked or permitted by a flow control valve 36 in fluid communication with the starter inlet via a duct 38. The control valve 36 is typically a butterfly valve or a poppet valve that is pneumatically actuated in response to a control signal 42 communicated to a solenoid valve 40 from the control unit 32.

The control unit 32 supplies power to the sensors 24,28 and receives sensor data therefrom, these interactions being collectively represented by lines 48 and 50 in FIG. 1. The data from the sensors 24,28 are provided in the form of frequency signals, and these are multiplied or divided as needed to provide signals ("$F_1$" and "$F_2$") indicative of the rotational speeds of the output shaft 16 and input shaft 18 respectively.

Figure 3:
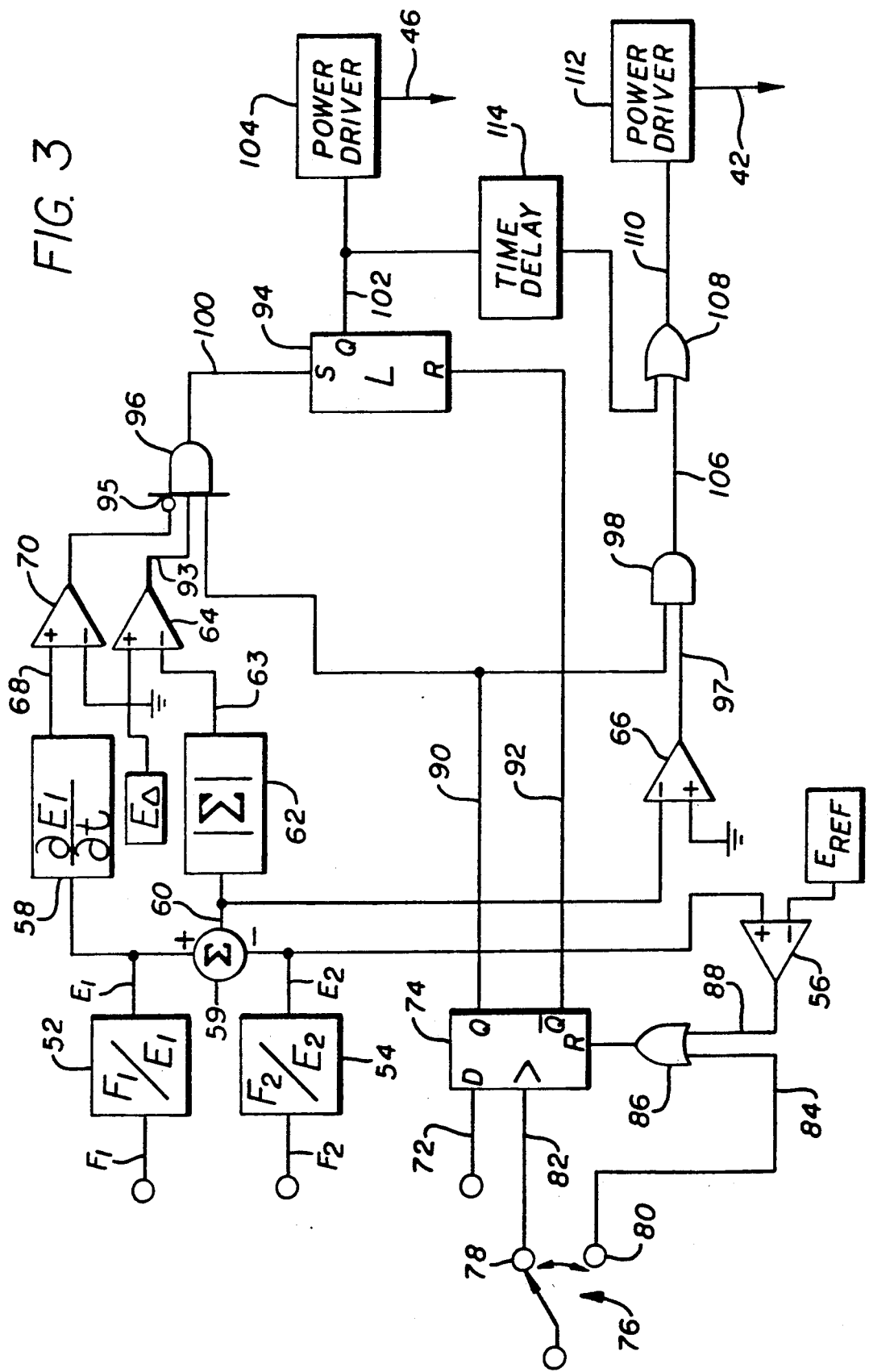
FIG. 3 is logic diagram that illustrates data processing operations performed by the electronic control unit shown in FIG. 1. It will be recognized that most of the illustrated processing can be implemented in hard-wired logic with either analog and/or digital circuit elements, or with suitably programmed microprocessor-based circuitry.

Referring now to FIG. 3, the frequency signals $F_1$, $F_2$ are received as inputs to respective frequency-to-voltage converters 52,54 which output voltage signals $E_1$ and $E_2$. Signal $E_2$ is received as the noninverting input to a comparator 56, the inverting input to which is a stored reference voltage $E_{REF}$ representing the magnitude of $E_2$ at the predetermined rotational speed associated with starter cutout (i.e. $E_{REF}$ is the $E_2$ observed when the starter 14 has accelerated the engine 10 to the speed at which disengagement is called for). Signal $E_1$ is received as an input to a differentiator 58. Both signals $E_1$ and $E_2$ are received at a summing operation 59. The absolute value of the sum 60 is formed at 62 and received as the inverting input 63 to a second comparator 64. The noninverting input to the comparator is a small reference voltage $E_\Delta$, which permits a very small difference between the rotational speeds of the shafts 16,18 while maintaining the requirement that these speeds be substantially equal. The sum signal 60 is also received as the inverting input to a third comparator 66, the noninverting input terminal of which is connected to ground. The output 68 of the differentiator 58 is received as the noninverting input to a fourth comparator 70, the inverting input terminal of which is connected to ground.

The "D" input 72 to a D-type flip-flop 74 is tied to logic-level one (hereinafter, "L1"). A switch 76 located in the cockpit of the aircraft is positionable at either a "start" position 78, as illustrated, or a "stop" position 80. When the switch is positioned at "start", the clock input 82 to the flip-flop 74 is at L1 and a first input 84 to an OR gate 86 is at logic-level zero (hereinafter, "L0"). When the switch 76 is positioned at "stop" 80 the immediately forementioned inputs 82,84 are at L0 and L1, respectively. The logic level of the second input 88 to the OR gate 86 depends on the relative magnitudes of the $E_2$ and $E_{REF}$ inputs to comparator 56. If $E_{REF}$ exceeds $E_2$ (i.e. if the predetermined engine speed exceeds the current engine speed), then input 88 is at L0, and if $E_2$ exceeds $E_{REF}$ then that input is at L1. Accordingly, the true output 90 from the flip-flop is at L1 when "start" is commanded by the illustrated position 78 of the switch 76 and $E_{REF}$ exceeds $E_2$. Conversely, since the output terminal of OR gate 86 is connected to the reset terminal of the flip-flop 74, the true output 90 is at L0 if either the switch 76 is at the "stop" position 80 or $E_2$ exceeds $E_{REF}$.

The complement output 92 of the flip-flop 74 is received as the reset input to a latch 94, and the true output 90 is received as an input to first and second AND gates 96 and 98.

The first AND gate 96 receives two additional inputs 93, 95 at logic levels which depend on the magnitude of the noninverting input 68 to the fourth comparator 70, and the relative magnitudes of the inputs $E_\Delta$, 63 to the second comparator 64. Accordingly, if "start" is commanded (i.e. switch 76 is at position 78) while $E_{REF}$ exceeds $E_2$; if the rotational speeds of the output shafts 16,18 (FIG. 1) are substantially the same (i.e. inputs $E_\Delta$ and 63 are substantially equal); and if the starter 14 (FIG. 1) is not accelerating (i.e. input 68 is not positive relative to ground), then the output 100 of the first AND gate 96 is at L1. The output 100 is received as the set input to the latch 94. The output 102 of the latch 94 is received as an input to a power driver 104 which responds at L1 by transmitting the control signal 46 to the three-way solenoid valve 44 (FIG. 1) so that the latter is positioned to permit pressurization of the actuator 22.

The second AND gate 98 receives an additional input 97 at a logic level which depends on the magnitude of the sum signal 60 relative to ground. Accordingly, the output 106 of the AND gate 98 is at L1 if "start" is commanded while $E_{REF}$ exceeds $E_2$ and $E_2$ exceeds $E_1$. The output 106 is an input to an OR gate 108, as is the output 102 from the latch 94. The output 110 of the OR gate 108 is an input to a second power driver 112. The power driver 112 responds to the input 110 at L1 by transmitting the control signal 42 to the actuator 40 (FIG. 1) for the control valve 36.

Since air turbine starters in practice decelerate more slowly than they accelerate, it is seen as undesirable to effect engagement when $F_1$ reaches $F_2$ during the acceleration mode. The preferred embodiment of the invention provides for softer engagement by accelerating the output shaft 16 until its speed slightly exceeds that of the input shaft 18, and then decelerating the output shaft so that engagement is effected during the deceleration mode. The control unit 32 accomplishes this via the differentiator 58 and fourth comparator 70. Less desirably, the invention can be practiced by effecting engagement during the acceleration mode.

Depending on the response time of the actuator 22 (FIG. 1), a time delay 114 (FIG. 3) may be required to prevent sudden acceleration of the starter during engagement.

The foregoing portion of the description, which includes the accompanying drawings, is not intended to restrict the scope of the invention to the preferred embodiment thereof or to specific details which are ancillary to the teaching contained herein. The invention should be construed in the broadest manner which is consistent with the following claims and their equivalents.

What is claimed is:

1. A method for accelerating a gas turbine engine with an air turbine starter, wherein the starter has an output shaft that is selectively engageable in driving relation with an input shaft which is engaged with the engine, and wherein the starter is adapted to receive and be driven by pressurized air delivered to an inlet of the starter via a flow control valve, comprising the steps of:
    (a) sensing the rotational speed, "$F_1$", of the output shaft;
    (b) sensing the rotational speed, "$F_2$", of the input shaft; and (c) selectively responding to the sensed rotational speeds when $F_2$ is initially greater than $F_1$ but less than a predetermined speed by:
        (1) first, increasing mass flow of the air to the starter inlet whereby the starter is accelerated until $F_1$ exceeds $F_2$;
        (2) second, decreasing mass flow of the air to the starter inlet whereby the starter is decelerated until $F_1$ is substantially equal to $F_2$;
        (3) third, engaging the output shaft in driving relation with the input shaft when $F_1$ is substantially equal to $F_2$; and
        (4) fourth, again increasing mass flow of the air to the starter inlet whereby the engine is accelerated until $F_2$ is substantially equal to the predetermined speed.

2. A method as recited in Claim 1 comprising the further step of:
    (5) fifth, disengaging the output shaft from driving relation with the input shaft when $F_2$ is substantially equal to the predetermined speed.

3. A method for accelerating a gas turbine engine with an air, turbine starter, wherein the starter has an output shaft that is selectively engageable in driving relation with an input shaft which is engaged with the engine, and wherein the starter is adapted to receive and be driven by pressurized air delivered to an inlet of the starter via a flow control valve, comprising the steps of:
    (a) sensing the rotational speed of the output shaft;
    (b) sensing the rotational speed of the input shaft; and
    (c) selectively responding to the sensed rotational speeds when the speed of the input shaft is greater than the speed of the output shaft but less than a predetermined speed by:
        (1) increasing mass flow of the air to the inlet whereby the starter is accelerated to a speed at which the speed of the output shaft is substantially the same as the speed of the input shaft; and
        (2) engaging the output shaft in driving relation with the input shaft when the speeds of the shafts are substantially the same.

4. A method as recited in claim 3 wherein the increasing and engaging steps are implemented in the order recited.

5. A method as recited in claim 4 wherein the mass flow is increased until the speed of the output shaft exceeds the speed of the input shaft, and further comprising the step of:
    (3) decreasing the mass flow when the speed of the output shaft exceeds the speed of the output shaft exceeds the speed of the input shaft whereby the starter is decelerated to a speed at which the speeds of the input and output shafts are substantially the same.

6. A method as recited in claim 5 comprising the further step, implemented after the recited increasing, decreasing, and engaging steps are implemented, of again increasing the mass flow whereby the starter is accelerated until the speed of the input shaft is substantially the same as the predetermined speed.

* * * * *